(12) United States Patent
Ito (10) Patent No.: US 6,553,059 B1
(45) Date of Patent: Apr. 22, 2003

(54) CORRELATION VALUE CALCULATION FOR USE IN A MOBILE COMMUNICATION SYSTEM

(75) Inventor: Katsutoshi Ito, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/189,938

(22) Filed: Nov. 12, 1998

(30) Foreign Application Priority Data

Jan. 9, 1998 (JP) .......................................... 10-002901

(51) Int. Cl.⁷ .......................... H04B 1/707; H04Q 7/20
(52) U.S. Cl. ....................................... 375/150; 455/422
(58) Field of Search .................................. 375/142, 150, 375/130, 147, 343, 367; 370/350, 335, 342, 503, 515; 455/422

(56) References Cited

U.S. PATENT DOCUMENTS

| 5,263,050 A | * 11/1993 | Sutterlin et al. ............ 375/150 |
| 5,274,675 A | * 12/1993 | Granau et al. .............. 375/343 |
| 5,509,036 A | * 4/1996 | Nakata ....................... 375/368 |

FOREIGN PATENT DOCUMENTS

| JP | 07-058669 | 3/1995 |
| JP | 08-084097 | 3/1996 |
| JP | 09-148980 | 6/1997 |
| JP | 06-006323 | 1/2001 |

OTHER PUBLICATIONS

Patent Abstracts of Japan, Publication No. 06–006323; Jan. 14, 1994.
Patent Abstracts of Japan, Publication No. 08–084097; Mar. 26, 1996.
Patent Abstracts of Japan, Publication No. 09–148980; Jun. 6, 1997.
Patent Abstracts of Japan, Publication No. 07–058669; Mar. 3, 1995.

* cited by examiner

*Primary Examiner*—Betsy L. Deppe

(57) ABSTRACT

A correlation value calculating apparatus reduces the calculating time with respect to the whole phase range. The correlation value calculating apparatus for multiplying a reception signal by a spreading code, thereby calculating a correlation value which gives a degree of correlation for the spreading code over a predetermined phase width on a predetermined length unit basis is constructed by: an arrangement for comparing an adaptively set threshold value with a correlation value calculated in an interval shorter than the predetermined length at the time of the calculation of the correlation value; an arrangement for executing the calculation of the correlation value over the whole interval of the predetermined length only in the case where the calculated correlation value exceeds the threshold value; and a discriminating arrangement for stopping the calculation of the correlation value in the case where the correlation value calculated in the interval shorter than the predetermined length does not exceed the threshold value.

4 Claims, 10 Drawing Sheets

CORRELATION VALUE CALCULATION FOR USE IN A MOBILE COMMUNICATION SYSTEM

BACKGROUND OF THE INVENTION

1. Field of the Invention

The invention relates to a correlation value calculator, and more particularly, to a correlation value calculator suitable for use in a mobile communication system in which a process for detecting a correlation value is required to be performed in a limited time.

2. Description of Related Art

Among the present available communicating techniques, there is a spread spectrum communication system in which transmission data is spread, for the transmission, to a signal having a band that is sufficiently wider than that of the transmission data. As a system in which this kind of communication system is used for the mobile communication, there is TIA/EIA/IS-95A CDMA mobile communication system that has been standardized in North America.

Figure 1:
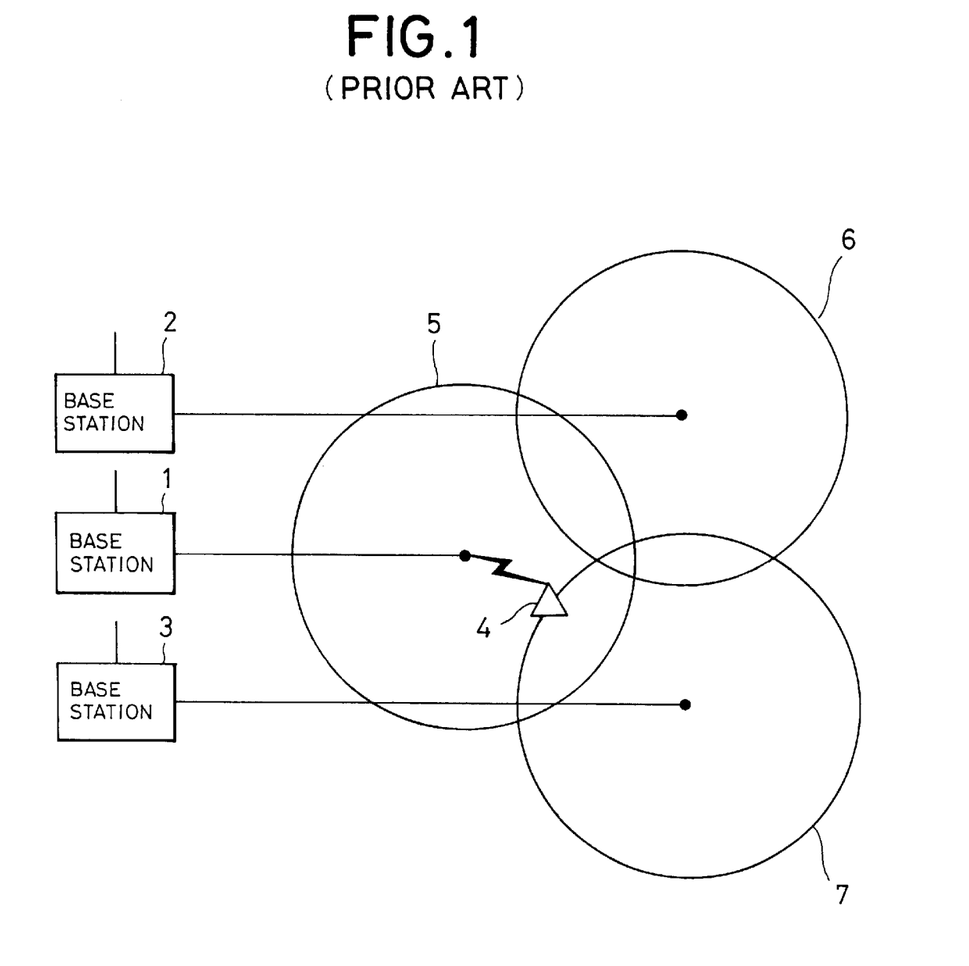
FIG. 1 is a diagram showing a fundamental construction of a CDMA mobile communication system.

FIG. 1 shows a basic structure of the CDMA mobile communication system. The CDMA mobile communication system of FIG. 1 exemplifies a system constituted by three fixed radio transmitters (hereinafter, referred to as "base stations") 1 to 3 and one mobile station 4. Radio zones 5 to 7 capable of communicating with the base stations 1 to 3 are shown by circles in the diagram. It is assumed that transmission data which is spread spectrum encoded by a base station identification code that is peculiar to each station is transmitted from each of the corresponding base stations 1 to 3 to the radio zones 5 to 7, respectively.

In the case of FIG. 1, the mobile station 4 is in a state in which a speech/data communication with the base station 1 has been established (that is, a state where it is synchronized with the base station identification code of the base station 1) and executes a demodulating process and a hand-off control of a reception signal on the basis of a detecting process of a multi-path signal which arrives from the base station 1 and signals which arrive from the adjacent base stations 2 and 3 and a measuring process of their signal intensities.

The outline of a signal detecting procedure and a signal intensity measuring procedure which are executed in the CDMA communication system will be described hereinafter. The processes (a) through (f) are executed in order, which are as follows.

(a) The base station 1 transmits a phase code range (SRCH_ASET_WIN_SIZE) which is presumed such that the muti-path signal can be detected by the mobile station 4.

(b) Based on the information given by (a), the mobile station 4 generates a spreading code of the base station 1 and obtains a correlation with the reception signal at each code phase.

(c) The mobile station 4 then allocates, to a demodulator (not shown), a spreading code phase of which the correlation value obtained in (b) is equal to or higher than a demodulation enabling level, and performs the demodulation respectively.

(d) The base station 1 transmits spreading code information (pilot PN offset) of the adjacent base stations 2 and 3 and a code phase range (SRCH_NSET_WIN_SIZE) which is presumed such that the signals from the adjacent base stations 2 and 3 can be detected to the mobile station 4.

(e) Based on the information given by (d), the mobile station 4 generates spreading codes of the adjacent base stations 2 and 3 and obtains a correlation with the reception signal at each code phase.

(f) When the correlation value obtained in (e) exceeds a threshold value (T_ADD) which has been predetermined from the base station 1, the mobile station 4 determines that the receivable adjacent base station signals could be demodulated, thereby reporting its fact to the base station 2.

To perform the signal detecting process and the signal intensity measuring process as mentioned above, in the receiver, the correlation between the spreading code which is generated in the receiver and the reception signal needs to be calculated with respect to all of the code phases which are designated from the base station.

A sliding correlation system is generally used currently as a correlation calculating means for this purpose. The system is operative to calculate a correlation with the reception signal while a spreading code phase on the receiver's side is being shifted.

Figure 2:
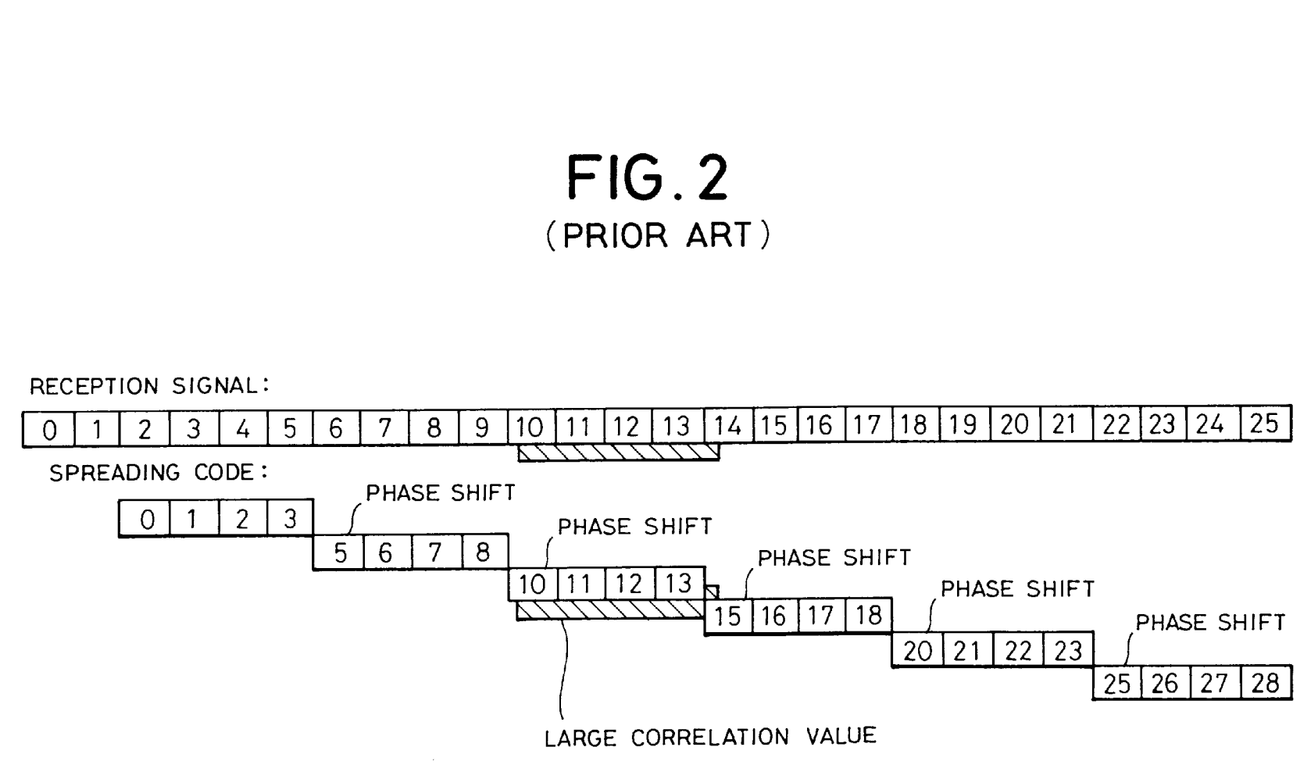
FIG. 2 is a diagram showing an operation principle of a detection of a sliding correlation.

FIG. 2 shows the principle of calculation of a sliding correlation. Particularly, FIG. 2 shows the principle of calculation in a case where a correlation length is equal to "4" and a search phase width, i.e., the number of phases in the range (24 code bits in FIG. 2) in which the correlation is searched is equal to "6". The figure shows operation contents performed when shifting the spreading code phase that is generated by the receiver by one phase each time the correlation calculation of the spreading code phase is performed.

Figure 3:
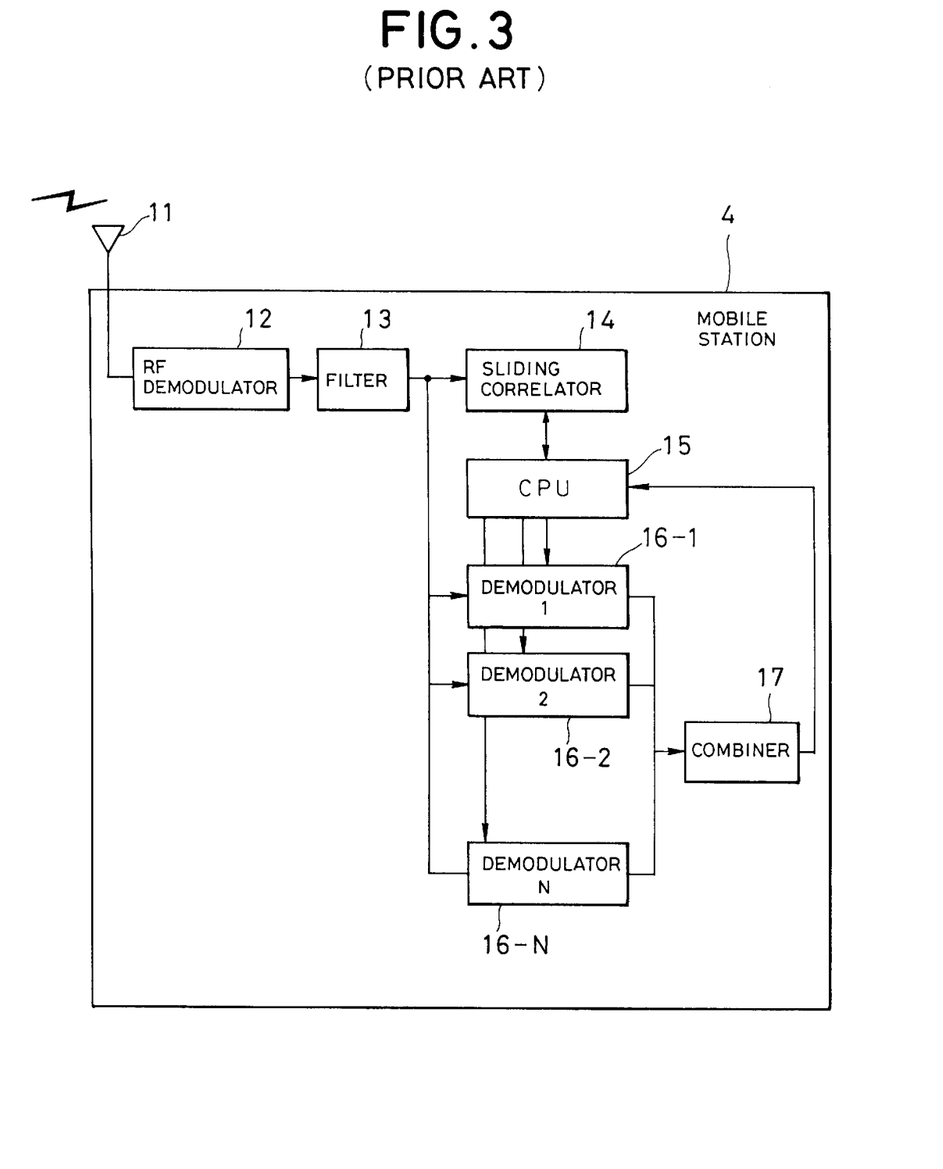
FIG. 3 is a block diagram showing a conventional construction of a mobile station receiving system.

FIG. 3 shows a structure of a reception signal system of the mobile station 4 having a sliding correlator 14 which operates in accordance with the above scheme. As shown in FIG. 3, the mobile station 4 has a reception signal system which is constituted by an antenna 11, an RF demodulator 12, a filter 13, the sliding correlator 14, a CPU 15, demodulators 16-1 to 16-N, and a combiner 17.

In the mobile station 4, the signal received by the antenna 11 is converted from a radio propagating frequency to a baseband signal by the RF demodulator 12 and is further subjected to waveform shaping by the filter 13. By supplying the waveform-shaped baseband signal to the sliding correlator 14 and a plurality of demodulators 16-1 to 16-N, respectively, the following searching process (a self base station searching process and an adjacent base station searching process) is performed.

Firstly, at the time of a self base station searching process, the sliding correlator 14 generates a spreading code and a pilot spreading code of the base station (self base station) currently communicating with, that is designated by the CPU 15, then obtains a correlation with an input signal while shifting a code timing in a phase range and a correlation length which are designated by the CPU 15, and supplies the obtained correlation value to the CPU 15. When the CPU 15 selects a receivable multi-path signal timing on the basis of the obtained correlation value, the CPU supplies code timing information to each of the demodulators 16-1 to 16-N. The demodulators 16-1 to 16-N generate the base station spreading code and data spreading code at the reception timing which is designated by the CPU 15 and demodulate reception data. The demodulated reception data is maximum ratio (M.R.) combined by the combiner 17 and is supplied as final reception data to the CPU 15.

At the time of the adjacent base station searching process, the sliding correlator 14 generates the spreading code and pilot spreading code of the adjacent base station designated by the CPU 15, obtains a correlation with the input signal while shifting the code timing in a phase range and a correlation length which are designated by the CPU 15 and supplies the obtained correlation value to the CPU 15. The CPU 15 discriminates or determines the presence or absence of the hand-off capable base station and its timing on the basis of the obtained correlation value. When the presence of the hand-off capable base station is determined, the CPU 15 notifies the self base station of this discrimination result.

As mentioned above, the sliding correlator 14 needs to always operate to search (multi-path search) the signal which arrives from the self base station through a different transmission path and to search a signal which arrives from the adjacent base station.

Although the sliding correlator 14 with the above construction has a feature such that it can be realized by a simple circuit construction, however, there is a problem that it takes a long time to calculate all of the correlations of the spread phase range which is designated from the base station because of a nature such that the correlation is calculated while shifting the phase. Moreover, as a result of the time needed to calculate the correlations as mentioned above, if a situation occurs such that the detection of the signal which arrives from the adjacent base station is delayed, there is a possibility that the hand-off fails and the shut-off of the communication occurs.

OBJECT AND SUMMARY OF THE INVENTION

The invention is made in consideration of the above problems and intends to provide a correlation value calculating apparatus which can realize a reduction of a time that is required for a correlation calculating process and can efficiently perform a detection of a signal and a measurement of its intensity.

To solve the above problem, in the invention, there is provided a correlation value calculating apparatus in which by multiplying a reception signal by a spreading code, a correlation value which gives a correlation degree for the spreading code is calculated over a predetermined phase width in units of predetermined length, wherein the apparatus comprises the following means.

That is, the apparatus has discriminating means for comparing a predetermined threshold value with a correlation value calculated in an interval shorter than a predetermined length at the time of calculation of a correlation value, for executing the calculation of the correlation value in a whole interval of the predetermined length only in the case where the calculated correlation value exceeds the threshold value, and for stopping the calculation of the correlation value in the case where the correlation value calculated in the interval shorter than the predetermined length does not exceed the threshold value.

As for the phase of a small correlation value, consequently, the correlation calculation can be stopped in a time shorter than the ordinary time without calculating the threshold value over the whole interval of the predetermined length, so that a reduction of the time which is required for calculation with regard to the whole predetermined phase width can be realized.

DETAILED DESCRIPTION OF THE PREFERRED EMBODIMENTS

An embodiment of a correlation value calculating apparatus according to the invention will now be described hereinbelow with reference to the drawings.

Principle of the Correlation Calculating Operation

First, a principle of a correlation calculating operation which is executed in each embodiment will be described. A sliding correlator of each embodiment, which will be explained hereinbelow, is characterized by separately executing the correlation calculation at two stages. That is, a calculating process of a correlation value is first executed with respect to an interval (hereinafter, referred to as an "early correlation length") shorter than a correlation length. When the correlation value is lower than a threshold value (hereinafter, referred to as an "early correlation threshold value") corresponding to the early correlation length, the correlation calculation is stopped by regarding that no signal exists. When the correlation value is larger than the early correlation threshold value, the calculation of the correlation value is executed over the whole correlation length by regarding that there is a possibility of the existence of the signal.

The above operation is made by paying attention to a principle that no signal component is included in most of the phases in the phase width of a spreading code which is designated from a base station. This is an operation that is devised to raise the calculating speed by stopping of the correlation calculation in most of the phases.

To efficiently effect early stopping of the correlation calculation, it is desirable to optimize the early correlation threshold value corresponding to the early correlation length. For this purpose, in each of the following embodiments, a plurality of methods of fluctuating the early correlation threshold value in accordance with a situation to enable the correlation calculation to be more efficiently executed will now be described.

(First Embodiment)

Figure 4:
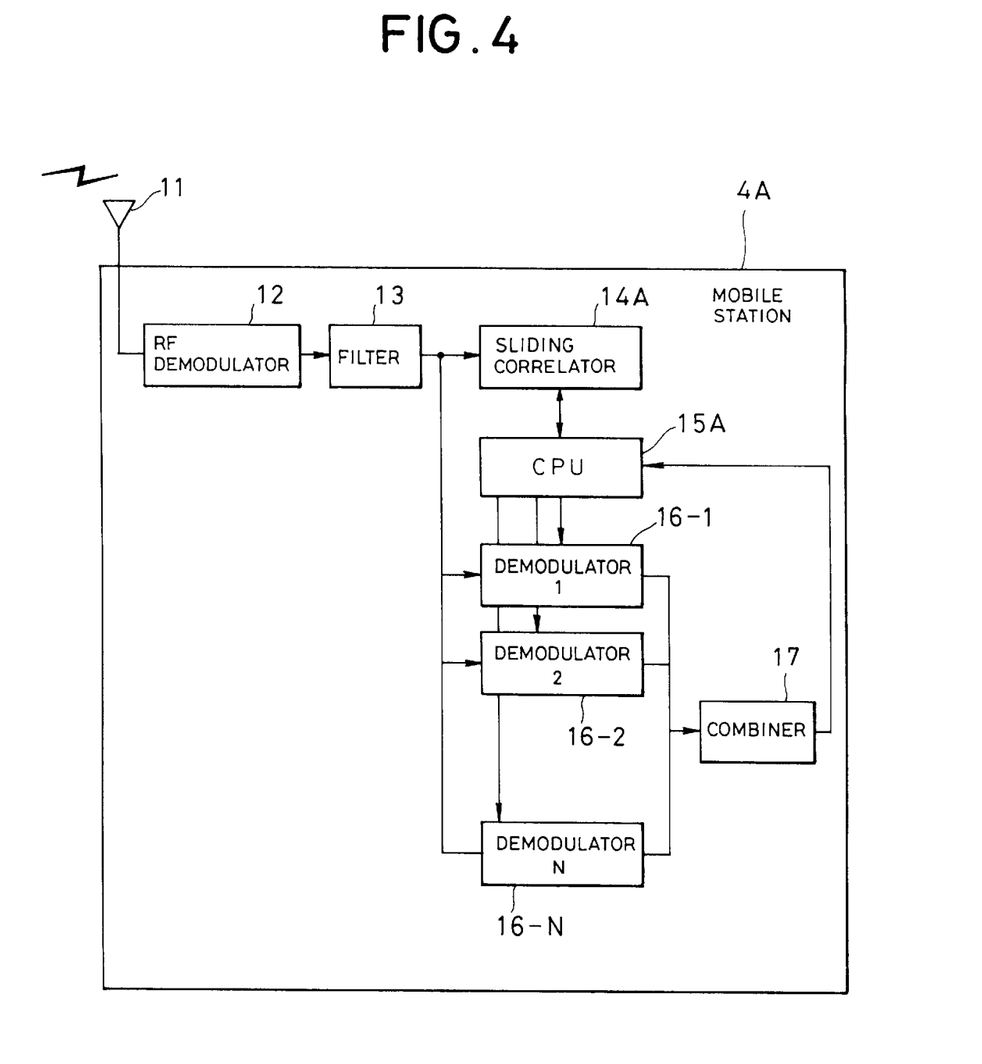
FIG. 4 is a block diagram showing an embodiment of the mobile station receiving system.

FIG. 4 shows a construction of a mobile station 4A according to the first embodiment. In FIG. 4, portions corresponding to those in FIG. 3 are designated by the same reference numerals. The mobile station 4A has almost the same construction as that of the mobile station 4 of FIG. 3 excluding a sliding correlator 14A and a CPU 15A.

Figure 5:
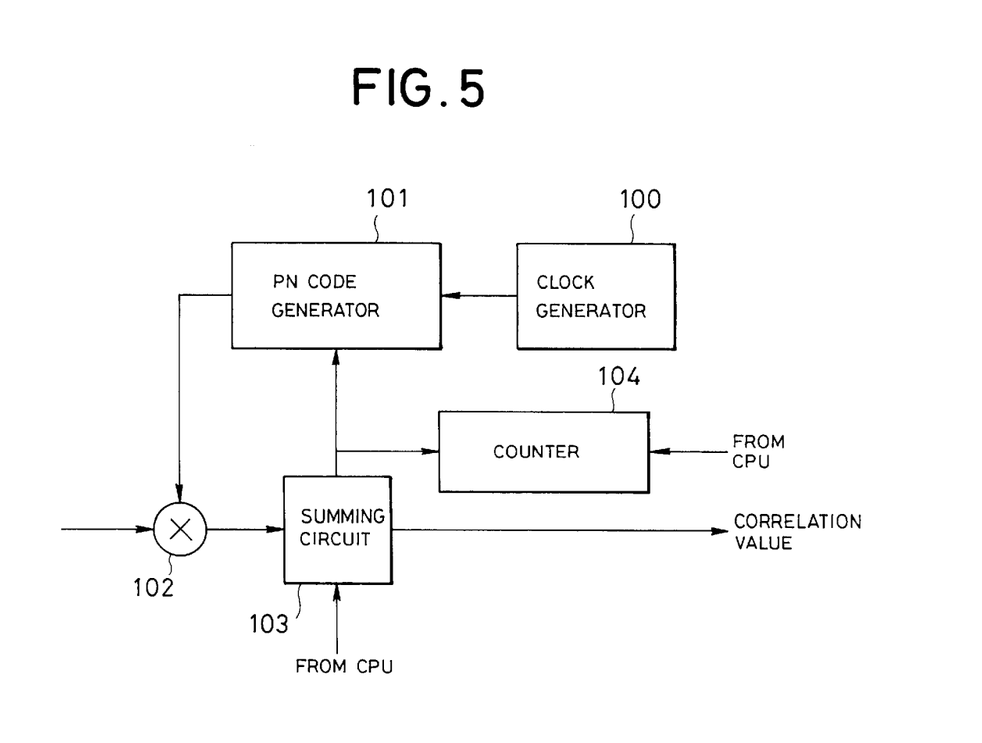
FIG. 5 is a block diagram showing the structure of the sliding correlator shown in FIG. 4.

FIG. 5 shows an example of the sliding correlator 14A shown in FIG. 4.

The sliding correlator 14A comprises a clock generator 100, a PN code generator 101, a multiplier 102, a summing circuit 103, and a counter 104 which are mutually connected in the manner as shown in FIG. 5, where the correlation value is generated at an output terminal of the summing circuit 103. The clock generator 100 generates a clock signal of a chip rate (data rate after the spreading), and supplies it to the PN code generator 101. In synchronism with the clock signal supplied from the clock generator 100, the PN code generator 101 produces a PN code in the manner explained below. The multiplier 102 performs the multiplication of the reception signal and the PN code supplied from the PN code generator 101 every chip. The summing circuit 103 adds up the output signal of the multiplier 102 up to N chips. The value of N is designated by the CPU 15A. After the completion of the summation of the values of N chips, the summing circuit 103 outputs the result of summation as the correlation value, then resets its contents (resets the value to zero). Furthermore, the summing circuit 103 instructs the PN code generator to shift the timing by one chip, and decreases the value of the counter 104 by one.

Figure 6:
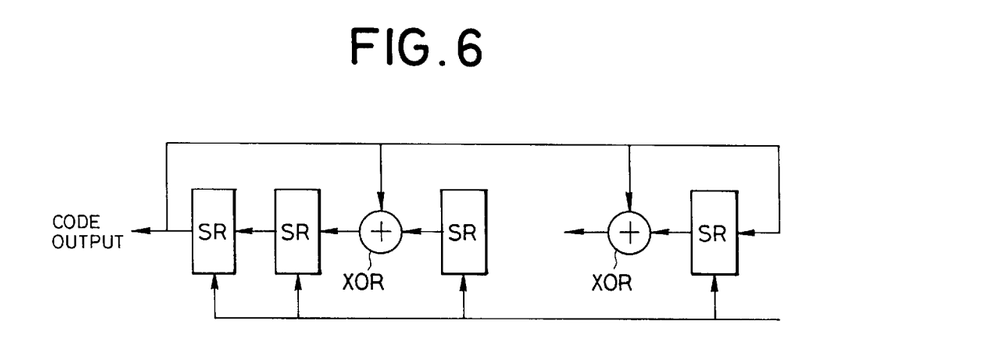
FIG. 6 is a diagram showing an example of the PN code generator.

The PN code generator 101 can be formed by a plurality of shift-registers SR and a plurality of exclusive OR operators XOR as depicted in FIG. 6. When a timing adjustment instruction is supplied from the summing circuit 103 as mentioned above, the PN code generator 101 stops the generation of its output signal for the period of one chip, so as to shift the timing of the code to be outputted by one chip. This operation of shifting the timing can be performed by stopping the clock input for the period of one chip. Alternatively, it is possible to arrange the PN code generator 101 to output the same data twice.

The counter 104 has its initial value designated by the CPU 15A, and the above-described operations of the elements of the sliding correlator 14A are repeated until when the count value of the counter 104 reaches zero.

The sliding correlator 14A is a correlation calculating means which operates in accordance with the above-described principle of operation. The CPU 15A is a means having a generating function of the early correlation threshold value corresponding to the early correlation length.

First, the generating operation of the early correlation threshold value corresponding to the early correlation length by the CPU 15A will be described. The CPU 15A generates a proper early correlation threshold value in accordance with the number of base stations and the width of the search window of each base station.

This is because the number of adjacent base stations and the phase width are fluctuated in accordance with the positional relation of the base stations existing in a district where communication services are provided and because a searching period and a calculation amount which are necessary also fluctuate in response to them. This is because, for example, when the number of adjacent base stations is large, a period which is required for the mobile station 4A to search each adjacent base station is also long and, if the search phase width is wide, a correlation calculation amount per adjacent base station also increases.

In the case where the mobile station moves at a high speed from a certain radio zone to another adjacent radio zone, the setting of a proper threshold value is important because it is required to detect a signal of the adjacent radio zone which the mobile station moves into, while the mobile station 4A is located in the present radio zone.

Figure 7:
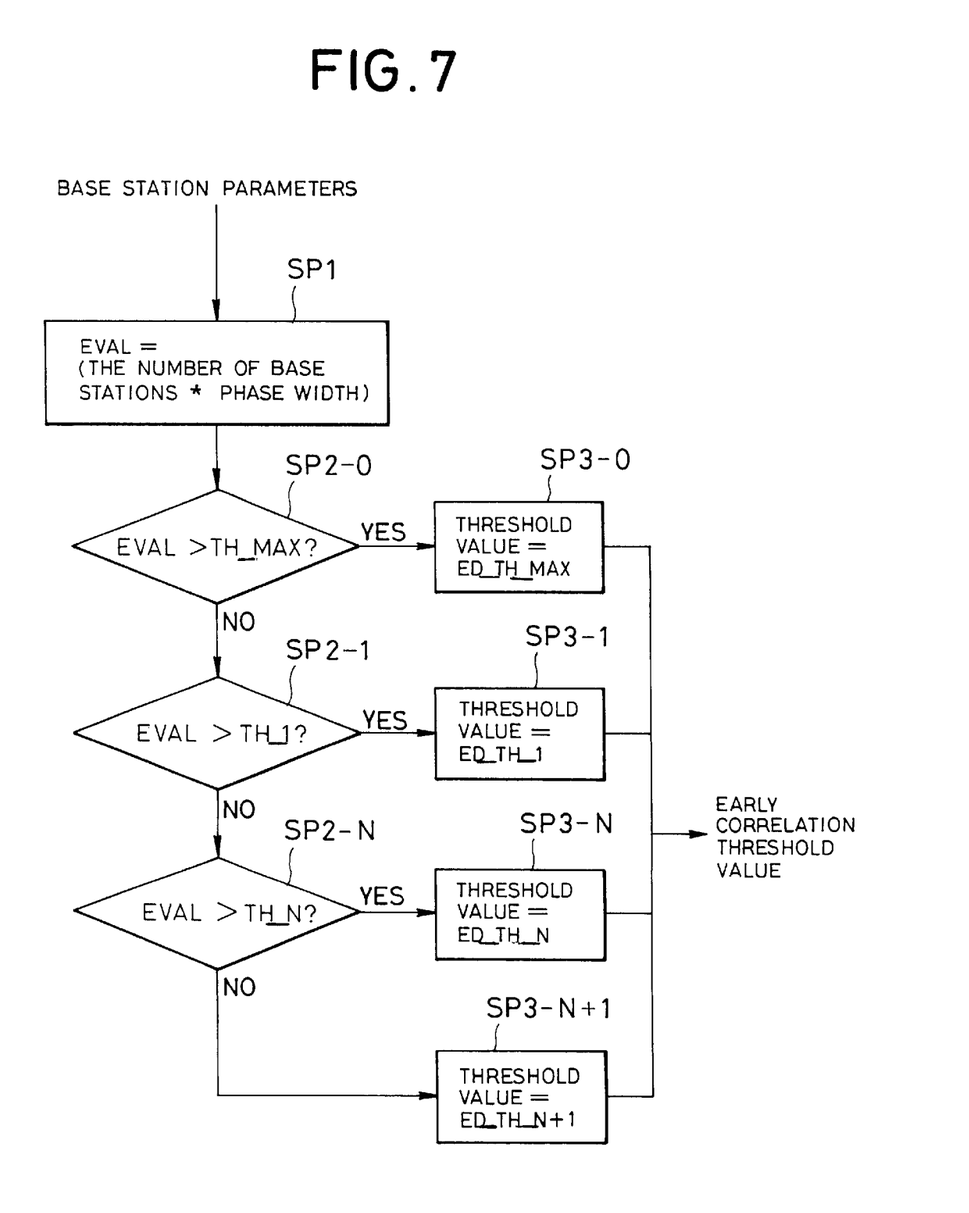
FIG. 7 is a flowchart showing a setting sequence of an early correlation threshold value.

In the CPU 15A according to the first embodiment, therefore, to reduce a period when each adjacent base station is searched, the early correlation threshold value is set on the basis of a sequence as shown in FIG. 7. As will be also understood from the above description, the first embodiment is made by mainly presuming the operation at the time of the searching process of the adjacent base station.

First, when base station parameters (an adjacent base station parameter message and a system parameter message) are received from the base station, the CPU 15A extracts the number of adjacent base stations to be searched by the mobile station from the adjacent base station parameter message, extracts the search phase width from the system parameter message, and calculates the total number of phases EVAL=(the number of base stations*the phase width) to be signal searched (step SP1).

When the total number of phases EVAL is calculated in step SP1, the CPU 15A discriminates an arrangement situation of the base stations locating around the mobile station 4A at (N+1) stages from a comparison result between the calculated value and a plurality of phase number discrimination threshold value (in the case of FIG. 7, N+1) (steps SP2-0 to SP2-N). However, it is assumed that the relations (TH_MAX>TH_1>TH_2> . . . >TH_N) are satisfied among the phase number discrimination threshold values.

The CPU 15A advances to a step of a corresponding threshold value setting process in accordance with the discrimination result and sets the early correlation threshold value which is supplied to the sliding correlator 14A in a corresponding step (steps SP3-0 to SP3-N).

For example, in the case where the calculated total number of phases is smaller than the maximum value TH_MAX of the phase number discrimination threshold value but is larger than the next large phase number discrimination threshold value TH_1, the CPU 15A obtains an affirmative result in step SP2-1, advances to corresponding step SP3-1, and sets the early correlation threshold value to ED_TH_1.

The relations (ED_TH_MAX>ED_TH_1> . . . >ED_TH_N>ED_TH_N+1) are satisfied among the early correlation threshold values. This is because as the number of phases to be searched is larger, a ratio at which the correlation calculation is early stopped is raised.

Figure 8:
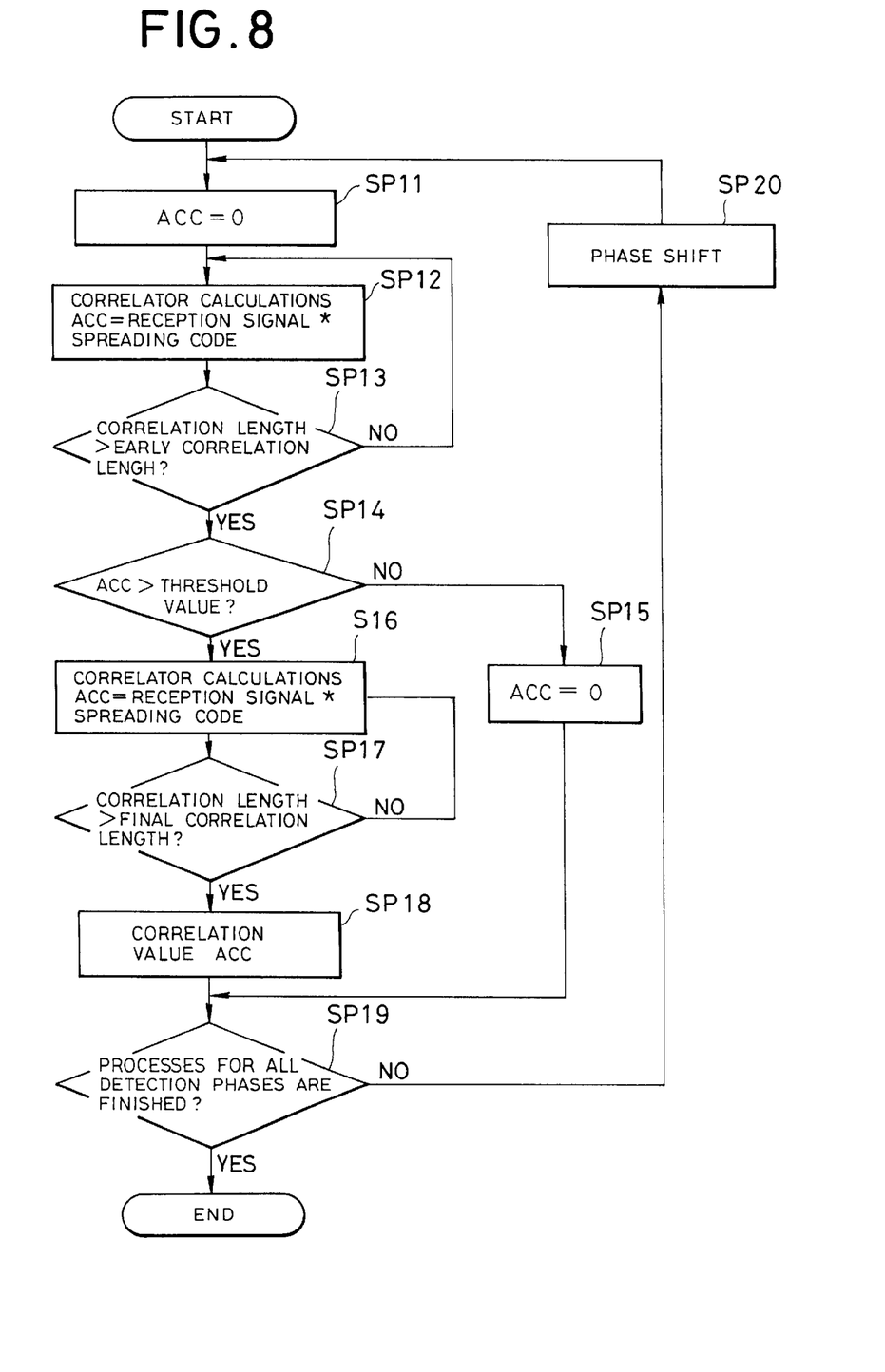
FIG. 8 is a flowchart showing a processing sequence of a sliding correlator which is common to each embodiment.

After completion of the above processes, the set early correlation threshold value ED_TH is supplied from the CPU 15A to the sliding correlator 14A. When the early correlation threshold value ED_TH is inputted, the sliding correlator 14A starts the correlation calculation based on the above operation principle. The operation contents are shown in FIG. 8.

First, the sliding correlator 14A initializes a correlation value ACC to 0 (step SP11). The sliding correlator 14A subsequently multiplies the reception signal inputted after the initialization by the spreading code generated from the mobile station 4A, thereby obtaining its correlation value (step SP12). This process is repeated until it is determined that the correlation length of the reception signal used for calculation of the correlation value is longer than the early correlation length (step SP13). The early correlation length has been preset (for example, it is set in a wireless manner at the time of communication). Now, assuming that the correlation length (final correlation length) is equal to "4" as shown in FIG. 2, the early correlation length is set to, for example, "2".

When it is soon confirmed that the correlation length exceeds the early correlation length (namely, an affirmative result is derived in step SP13), the sliding correlator 14A compares the correlation value ACC obtained by the process in step SP12 with the early correlation threshold value ED_TH set by the CPU 15A.

Since the discrimination result is negative here in many cases, in order to stop early the correlation calculation, the sliding correlator 14A advances to a process in step SP15 and sets the correlation value ACC at the relevant search phase to 0.

After that, the sliding correlator 14A advances to step SP19 and discriminates whether the processes with respect to all of the search phase widths have been finished or not. While it is determined that the searches about all of the search phase widths are not finished, the processing routine advances to a process in step SP20 and the phase of the spreading code is shifted by one. The processing routine is returned to the process in step SP11, so that the processing routine advances to the correlation value calculating process with regard to the next search phase. In the case of FIG. 2, the calculating processes of the correlation values at the first and second search phases correspond to the early stopping operation.

On the other hand, in step SP14, when it is determined that the calculated correlation value exceeds the early correlation threshold value ED_TH, the sliding correlator 14A advances from step SP14 to step SP16 and continues the calculation of the correlation value also including the reception signal which is inputted to the correlation length exceeding the early correlation length. This calculating process is repeated until it is decided in step SP17 that the correlation length used in the calculation has exceeded the final correlation length.

When it is determined that the correlation length has exceeded the final correlation length, the sliding correlator 14A advances to step SP18 and sets the calculation result obtained finally with respect to the relevant search phase as a correlation value ACC. In the case of FIG. 2, it corresponds to the calculating process of the correlation value at the third search phase.

After that, the sliding correlator 14A advances to step SP19 to discriminate whether the calculation of the correlation value should be further continued or not. As mentioned above, a check is made to see if the processes have been finished with respect to all of the search phase widths. When it is decided that the searches about all of the search phase widths are not finished, the processing routine also advances to the process in step SP20. The phase of the spreading code is shifted by one and the processing routine is returned to the process in step SP11.

By repeating the above operations, if the processes with regard to all of the search phase widths are finished, the sliding correlator 14A exits from the loop process of FIG. 8 and notifies the CPU 15A of the obtained correlation value.

After that, the CPU 15A discriminates the presence or absence of the hand-off capable base station and its timing from the result of the obtained correlation value. When the hand-off capable base station is found, this fact is notified to the base station which is at present under communication through a transmitting system. The above processes relate to the operation contents which are peculiar to the embodiment.

According to the first embodiment as mentioned above, as the number of phases to be searched is larger, the value of the early correlation threshold value is set to be higher, thereby improving the probability of stopping the correlation calculation, namely, enabling an early stopping ratio for noises to be set to a high value. The reduction, therefore, of the total time which is required to search the adjacent base stations (reduction of the searching period per base station) can be realized. Even in the case where the mobile station moves to the adjacent radio zone at a high speed, consequently, the necessary detecting operation can be completed and the possibility of the occurrence of the stop of the speech communication can be solved.

(Second Embodiment)

Subsequently, the processing operation of the mobile station according to the second embodiment will now be described. A construction of a mobile station according to the second embodiment is similar to that of the mobile station 4A according to the first embodiment except for a point that only the setting operation of the early correlation threshold value which is executed by the CPU 15A differs.

That is, the CPU 15A according to the second embodiment differs with respect to a point that the early correlation threshold value ED_TH is set by using a hand-off threshold value (threshold value which is used to discriminate whether the signal that is received from the adjacent base station has an intensity enough to hand-off or not) T_ADD.

The reason why the hand-off threshold value (T_ADD) is used to set the early correlation threshold value ED_TH in the second embodiment as mentioned above is because it is particularly unnecessary to detect the correlation value with respect to the signal in which there is essentially no possibility such that the correlation value exceeds the hand-off threshold value T_ADD.

That is, this is because when a high value is required as a hand-off threshold value T_ADD, the hand-off is also hard to occur due to such a high value and, in this case, by setting the early correlation threshold value to a relatively large value, the calculating process of the correlation value can be early stopped with respect to the search phase in which there is no possibility of exceeding the hand-off threshold value T_ADD.

Figure 9:
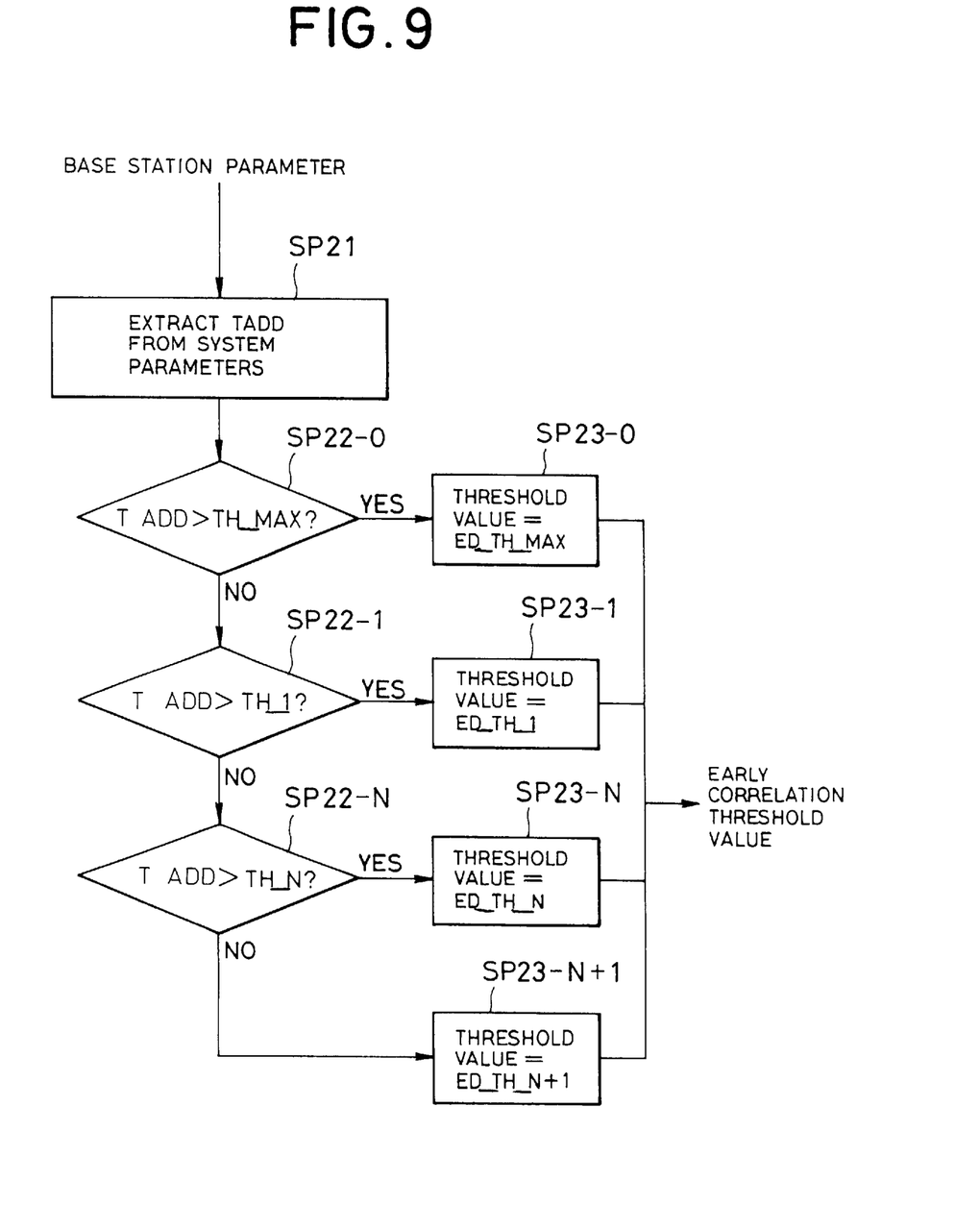
FIG. 9 is a flowchart showing the setting sequence of the early correlation threshold value.

The setting operation of the early correlation threshold value which is executed by the CPU 15A according to the second embodiment will now be described with reference to FIG. 9.

First, when the base station parameters (the adjacent base station parameter message and the system parameter message) are received from the base station, the CPU 15A extracts the hand-off threshold value T_ADD from the adjacent base station parameter message (step SP21).

When the hand-off threshold value T_ADD is extracted as mentioned above in step SP21, the CPU 15A discriminates the threshold level notified from the base station at (N+1) stages from the comparison result between the extracted value and a plurality of level discrimination threshold values (N+1 in the case of FIG. 9) (steps SP22-0 to SP22-N). It is now assumed that the relations (TH_MAX>TH_1>TH_2> . . . >TH_N) are satisfied among the level discrimination threshold values.

In the case of the CPU 15A, the processing routine advances to the step of the corresponding threshold value setting process in accordance with the discrimination result. The early correlation threshold value which is supplied to the sliding correlator 14A is set in a corresponding step (steps SP23-0 to SP23-N).

For example, in the case where although the extracted hand-off threshold value T_ADD is smaller than the maximum value TH_MAX of the level discrimination threshold value, it is larger than the next large phase number discrimination threshold value TH_1, the CPU 15A obtains an affirmative result in step SP22-1 and advances to corresponding step SP23-1 and sets the early correlation threshold value to ED_TH_1.

As an early correlation threshold value, a value such that a signal detection ratio for each hand-off threshold value T_ADD is set to, for example, 98% is set in consideration of the relation between a correlation value distribution of noises which is preliminarily obtained by simulation and a correlation distribution of each hand-off threshold value T_ADD.

Figure 10:
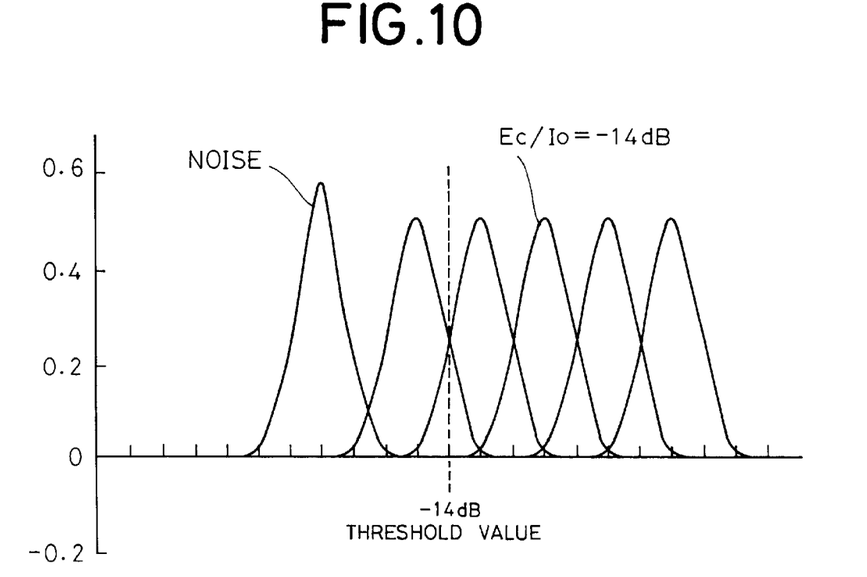
FIGS. 10 and 11 are diagrams showing relations between distributions of correlation values as detection targets and early correlation threshold values which are set in correspondence to them.
Figure 11:
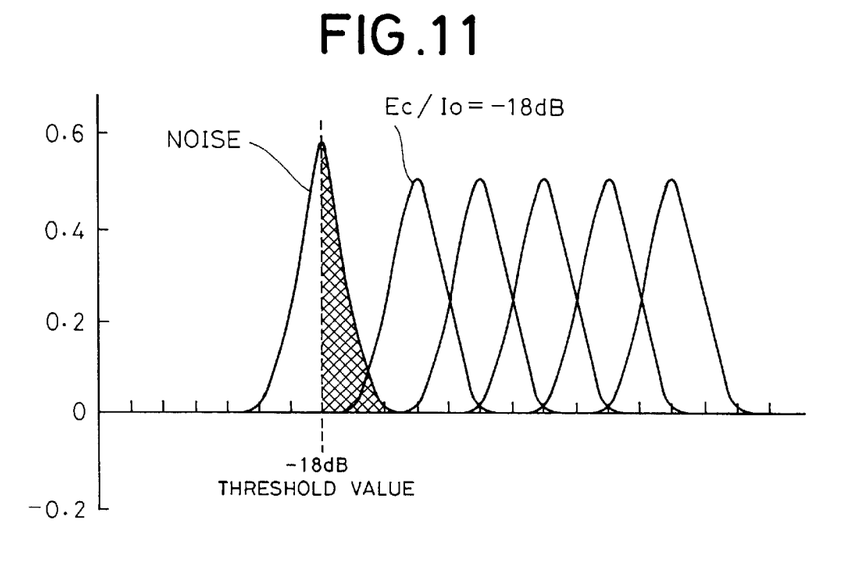

Setting examples are shown in FIGS. 10 and 11. FIGS. 10 and 11 show correlation value distributions in the early correlation length of the noises and the reception levels. The upper stage (FIG. 10) shows the setting example of the early correlation threshold value ED_TH in the case where the hand-off threshold value T_ADD is equal to −14 dB. The lower stage (FIG. 11) shows the setting example of the early correlation threshold value ED_TH in the case where the hand-off threshold value T_ADD is equal to −18 dB, respectively.

In the case of FIG. 10, an early correlation stopping ratio for the noise signal is equal to almost 100% (FIG. 10) when the hand-off threshold value T_ADD=−14 dB and is equal to about 40% (FIG. 11) when the hand-off threshold value T_ADD=18 dB. In both of the above cases, signal detection ratios are equal to almost 100%.

As mentioned above, although the early correlation threshold value which is obtained by the CPU 15A is set to be higher as the hand-off threshold value T_ADD is larger (namely, ED_TH_MAX>ED_TH_1> ... >ED_TH_N>ED_TH_N+1), since it is the value calculated on the basis of the signal distributions as shown in FIGS. 10 and 11, no influence is exerted on the signal detection ratios of a desired level.

Therefore, in the correlation detection in the sliding correlator 14A, a ratio such that the correlation calculation of noises and the unnecessary low reception level signal increases without exerting any influence on the signal detection ratio. A correlation calculating time which is necessary per phase is deleted.

According to the second embodiment as mentioned above, since the value of the early correlation threshold value ED TH is adaptively changed in accordance with the level of the hand-off threshold value T_ADD which is given from the base station, the calculation of the correlation value except for the signal having a possibility of occurrence of the hand-off can be early stopped. The reduction of the total time which is required for the search of the adjacent base stations which is executed for the hand-off detection (reduction of the searching period per base station) can be realized.

Since the searching process itself is finished in a short time as mentioned above, even in the case where the mobile station moves at a high speed to the adjacent radio zone, the hand-off can be certainly performed without a possibility of occurrence of the interruption of a speech communication.

(Third Embodiment)

The processing operation of the mobile station according to the third embodiment will now be described. Even in the case of the third embodiment, a construction of a base station is similar to those in the first and second embodiments except for only the setting operation of the early correlation threshold value which is executed by the CPU 15A.

That is, the CPU 15A according to the third embodiment differs with respect to a point that on the basis of the receiving state of the reception signal received from the base station which is at present in a communicating state, the setting of the early correlation threshold value which is used in the self base station searching process and the early correlation threshold value which is used in the adjacent base station searching process is changed, thereby optimizing the time which is distributed to each process.

The reason why the third embodiment considers the receiving state upon setting of the early correlation threshold value ED_TH is because, for example, it is undesirable from a viewpoint of a processing efficiency that much time is allocated for the adjacent base station search in spite of a fact that there is obviously no necessity of the hand-off.

Figure 12:
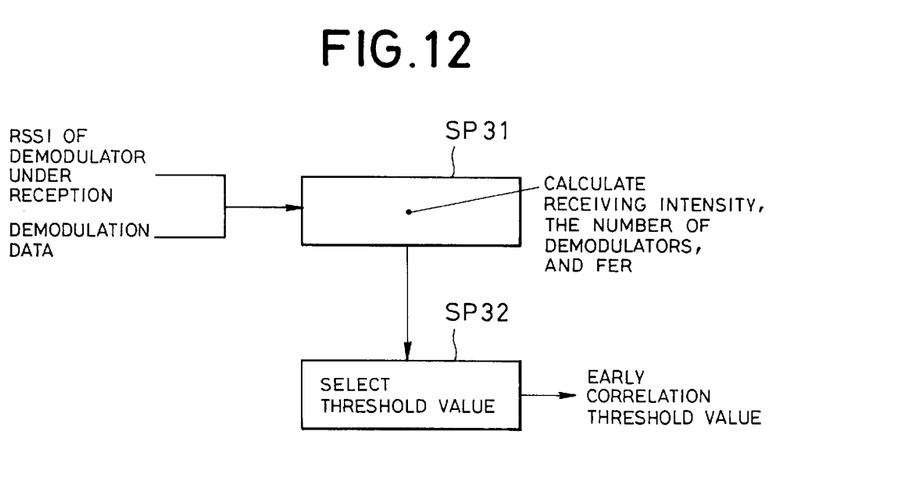
FIG. 12 is a flowchart showing the setting sequence of the early correlation threshold value.

The setting operation of the early correlation threshold value which is executed by the CPU 15A according to the third embodiment will now be described with reference to FIG. 12.

First, when a reception signal intensity (RSSI) which is under reception and given from each demodulator (finger) 16-i and the reception data after having been demodulated by the combiner 17 are received, the CPU 15A obtains a present reception level (level after the rake combination) and the number of demodulators which are used for the present reception from each of the inputted reception signal intensities (RSSI) and calculates a frame error rate of the reception data from the reception data (step SP31). For the calculation of the frame error rate, it is desirable to use an error detection code (CRC) included in the reception data.

In step SP31, when those three values are obtained as mentioned above, the CPU 15A performs the following discrimination by using those three values and selects the proper early correlation threshold value according to the receiving state (step SP32).

For example, in the case where the present reception level is higher than a threshold value (RSSI TH) for reception level discrimination and the frame error rate is lower than a threshold value (FER_TH) for error rate discrimination and none of the demodulators 16-i is left unused (in other words, all of the demodulators 16-1 to 16-N are used), the CPU 15A determines that both of the necessity of the hand-off and the necessity of the multi-path signal detection do not exist. The CPU 15A selects a relatively large early correlation threshold value ED_TH so that the sliding correlator 14A operates only in the case where a reception signal intensity which is equal to or larger than the reception signal intensity of the demodulator of the lowest reception signal intensity (RSSI) among the demodulators which are at present receiving will appear in future.

For example, in the case where the present reception level is higher than the threshold value (RSSI_TH) for discriminating the reception level and the frame error rate is lower than the threshold value (FER_TH) for error rate discrimination and the demodulator 16-i which is not used exists, the CPU 15A determines that although the hand-off is unnecessary, there is a necessity of the multi-path search (namely, decides that the self base station searching process is necessary). The CPU 15A sets the value of the early correlation threshold value ED_TH at the time of the relevant process to a low value and sets the value of the early correlation threshold value ED_TH at the time of the adjacent base station searching process to a high value. A probability that the correlation calculation is early stopped, therefore, is high at the time of the adjacent base station searching process and the processing time can be reduced.

For example, in the case where the present reception level is lower than the reception level discriminating threshold value (RSSI_TH) and the frame error rate is higher than the error rate discriminating threshold value (FER_TH), it is determined that there are both of the necessity of the hand-off and the necessity of the multi-path search. The CPU 15A sets the early correlation threshold values ED_TH at the time of the self base station searching process and at the time of the adjacent base station searching process to low values. The mobile station 4A, consequently, can prepare for the hand-over while improving the receiving sensitivity.

According to the third embodiment as mentioned above, therefore, in accordance with the receiving state of the reception signal from a certain base station which is at present under communication, the early correlation threshold value ED_TH can be set to a high value with respect to the searching process in which the necessity is small and, on the contrary, the early correlation threshold value ED_TH can be set to a low value with respect to the searching process in which the necessity is high. By combining (rake combining) the outputs of the demodulators 16-i, consequently, it is also possible to realize a construction such that only the demodulators which can further improve the communicating quality are allowed to selectively detect. That is, when the signal from the present base station is very strong, by setting the early correlation threshold value ED_TH to a high value, the time which is required for the self base station searching process can be reduced and the adjacent base station can be also searched earlier owing to the reduced time.

(Fourth Embodiment)

The processing operation of the mobile station according to the fourth embodiment will now be described. A construction of the mobile station according to the fourth embodiment is also similar to that of the mobile station 4A according to the foregoing embodiments, namely, the first to third embodiments except that only the setting operation of the early correlation threshold value which is executed by the CPU 15A differs.

That is, the CPU 15A according to the fourth embodiment differs with respect to a point that the necessity of the correlation detection is discriminated in accordance with a state of a signal which is at present being received and a point that when the necessity is decided, the early correlation threshold value is set on the basis of the base station parameter notified from the base station.

The reason why the early correlation threshold value is set only when the necessity of the correlation detection is decided in the fourth embodiment as mentioned above is because if the correlation detecting process is also performed in the case where it is unnecessary, not only the processing time becomes long but also it is necessary to reduce an electric power which is consumed in vain.

Figure 13:
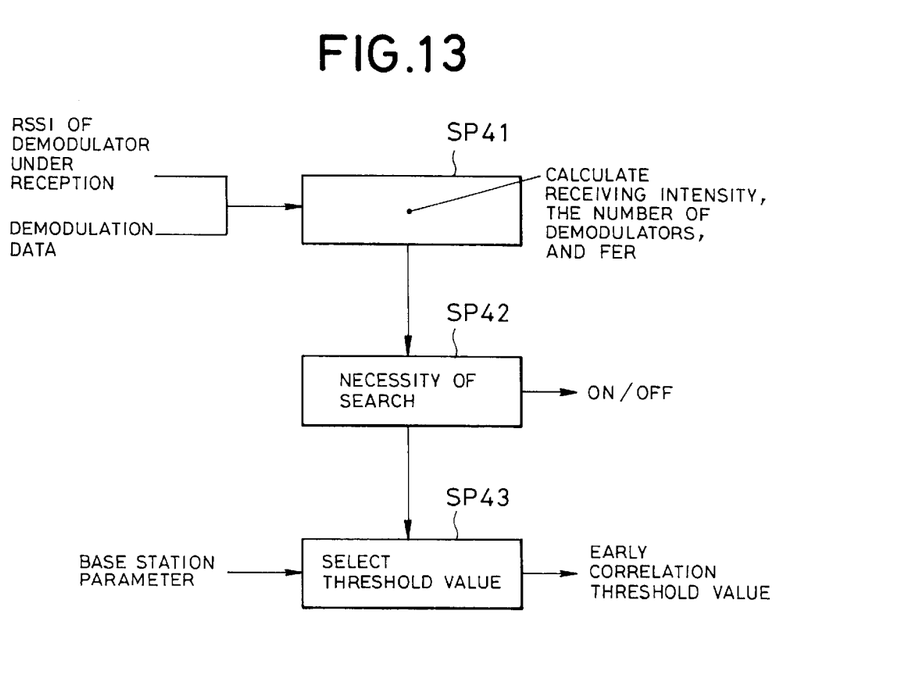
FIG. 13 is a flowchart showing the setting sequence of the early correlation threshold value.

The setting operation of the early correlation threshold value which is executed by the CPU 15A according to the fourth embodiment will now be described with reference to FIG. 13.

First, when the reception signal intensity (RSSI) which is under reception and given from each demodulator (finger) 16-i and the reception data after it was demodulated by the combiner 17 are inputted, the CPU 15A obtains the present reception level (level after the rake combination) and the number of demodulators which are used at present for reception from the inputted reception signal intensities (RSSI) and calculates the frame error rate of the reception data from the reception data (step SP41). For the calculation of the frame error rate, it is desirable to use the error detection code (CRC) included in the reception data. The processes so far are the same as those in the foregoing third embodiment.

In the third embodiment, the processing routine immediately advances to the setting process of the early correlation threshold value on the basis of the reception level obtained as mentioned above, the number of demodulators and the frame error rate. The CPU 15A in the fourth embodiment, however, discriminates the presence or absence of the necessity of the adjacent base station search from the obtained information and controls the on/off operation of the sliding correlator 14A in accordance with a discrimination result (step SP42).

If it is determined that the search is unnecessary, the CPU 15A transmits a stop command to the sliding correlator 14A. It is, however, desirable to always perform the multi-path signal search of the present base station in order to cope with a sudden change in transmission path such as a shadowing or the like.

Although several methods are considered as a discriminating method so far, for example, a method whereby if the early correlation threshold value which is temporarily obtained due to a reference based on the third embodiment is larger than a certain value, it is determined that the correlation detection is unnecessary and, when it is smaller than the certain value on the contrary, the necessity of the correlation detection is determined or the like is used.

On the other hand, when it is decided that the correlation detection is necessary, the CPU 15A extracts the number of adjacent base stations, phase width, and hand-off threshold value T_ADD from the base station parameters received from the base station and executes the calculating process of the early correlation threshold value ED_TH based on them (step SP43).

The calculating process is executed by, for instance, the following method of a combination of the first and second embodiments. First, two early correlation threshold values are calculated on the basis of a discriminating method in each embodiment. The two early correlation threshold values are compared and the smaller early correlation threshold value is selected as a final value.

When the final early correlation threshold value is set as mentioned above, the CPU 15A supplies the early correlation threshold value to the sliding correlator 14A and transmits a start command of the correlation calculation.

According to the fourth embodiment as mentioned above, the receiving state of the reception signal from a certain base station which is at present under communication and the base station parameters which are notified from the base station are combined, the unnecessary correlation searching operation is perfectly stopped, and the early stop ratio of the correlation search with respect to the necessary correlation searching operation is improved, so that the further low electric power consumption and the effective use of the calculation resources can be realized.

(Other Embodiments)

Each of the above embodiments has been mentioned with respect to the case of realizing the optimization of the correlation detecting operation by fixing the early correlation length and adaptively setting the early correlation threshold value corresponding thereto. On the contrary, however, it is also possible to use a construction such that the early correlation threshold value is fixed and the early correlation length corresponding thereto is adaptively set. That is, the value which is set on the basis of the discrimination result in each embodiment can be also set to the early correlation length instead of the early correlation threshold value.

Although the first embodiment has been described with respect to the case of using the processing contents mainly at the time of the adjacent base station searching process in the first embodiment, the processing contents can be also applied to the self base station searching process (namely, searching process of the multi-path signal which arrives from the self base station).

Although the third embodiment has been mentioned with respect to the case of setting some early correlation threshold values with respect to all of the receiving states, as shown in the case of the fourth embodiment, it is also possible to construct in a manner such that some reference is provided and when the calculated early correlation threshold value is larger than the reference, the sliding correlator 14A is turned off by supplying a stop command thereto.

According to the invention as mentioned above, upon calculation of the correlation value, the predetermined threshold value is compared with the correlation value calculated in an interval shorter than a predetermined length. Only when the calculated correlation value exceeds the threshold value, the calculation of the correlation values over the whole interval of a predetermined length is executed. When the correlation value calculated in the interval shorter than the predetermined length does not exceed the threshold value, the calculation of the correlation value is stopped. The calculation of the correlation value, therefore, can be executed with respect to only the phase having a high correlation value and the reduction of the time that is required for the whole processes can be realized.

What is claimed is:

1. A correlation value calculating apparatus for multiplying a reception signal by a spreading code, thereby calculating a correlation value which gives a degree of correlation for the spreading code in units of a predetermined length over a predetermined phase width, on a predetermined length unit basis comprising:

a discriminating means for comparing a predetermined threshold value with a correlation value calculated in an interval shorter than said predetermined length at the time of the calculation of the correlation value, executing the calculation of the correlation value over a whole interval of the predetermined length only in the case where said calculated correlation value exceeds said predetermined threshold value, and stopping a further calculation of the correlation value in the case where the correlation value calculated in the interval shorter than said predetermined length does not exceed said predetermined threshold value;

a means for adaptively setting on a reception side the predetermined threshold value for the correlation value that is calculated in the interval shorter than said predetermined length, and for adaptively setting the predetermined threshold value for the correlation value that is calculated in the interval shorter than said predetermined length in accordance with the number of phases as search targets.

2. A correlation value calculating apparatus for multiplying a reception signal by a spreading code, thereby calculating a correlation value which gives a degree of correlation for the spreading code in units of a predetermined length over a predetermined phase width, comprising:

a discriminating means for comparing a predetermined threshold value with a correlation value calculated in an interval shorter than said predetermined length at the time of the calculation of the correlation value, executing the calculation of the correlation value over a whole interval of the predetermined length only in the case where said calculated correlation value exceeds said predetermined threshold value, and stopping a further calculation of the correlation value in the case where the correlation value calculated in the interval shorter than said predetermined length does not exceed said predetermined threshold value; and a means for adaptively setting on a reception side the predetermined threshold value for the correlation value that is calculated in the interval shorter than said predetermined length and for adaptively setting the predetermined threshold value for the correlation value that is calculated in the interval shorter than said predetermined length in accordance with a hand-off threshold value which is designated from a transmission side.

3. A correlation value calculating apparatus for multiplying a reception signal by a spreading code, thereby calculating a correlation value which gives a degree of correlation for the spreading code in units of a predetermined length over a predetermined phase width, comprising: a discriminating means for comparing a predetermined threshold value with a correlation value calculated in an interval shorter than said predetermined length at the time of the calculation of the correlation value, executing the calculation of the correlation value over a whole interval of the predetermined length only in the case where said calculated correlation value exceeds said predetermined threshold value, and stopping a further calculation of the correlation value in the case where the correlation value calculated in the interval shorter than said predetermined length does not exceed said predetermined threshold value; and, a means for fixing the predetermined threshold value for the correlation value that is calculated in the interval shorter than said predetermined length and for adaptively setting the interval shorter than said predetermined length that is used for the calculation of the correlation value on a reception side, wherein the means for adaptively setting adaptively sets the interval shorter than said predetermined length in accordance with a number of phases as search targets.

4. A correlation value calculating apparatus for multiplying a reception signal by a spreading code, thereby calculating a correlation value which gives a degree of correlation for the spreading code in units of a predetermined length over a predetermined phase width, comprising: a discriminating means for comparing a predetermined threshold value with a correlation value calculated in an interval shorter than said predetermined length at the time of the calculation of the correlation value, executing the calculation of the correlation value over a whole interval of the predetermined length only in the case where said calculated correlation value exceeds said predetermined threshold value, and stopping a further calculation of the correlation value in the case where the correlation value calculated in the interval shorter than said predetermined length does not exceed said predetermined threshold value; and, a means for fixing the predetermined threshold value for the correlation value that is calculated in the interval shorter than said predetermined length and for adaptively setting the interval shorter than said predetermined length that is used for the calculation of the correlation value on a reception side, wherein the means for adaptively setting adaptively sets the interval shorter than said predetermined length in accordance with a hand-off threshold value which is designated from a transmission side.

* * * * *

UNITED STATES PATENT AND TRADEMARK OFFICE
CERTIFICATE OF CORRECTION

PATENT NO. : 6,553,059 B1
DATED : April 22, 2003
INVENTOR(S) : Katsutoshi Ito

It is certified that error appears in the above-identified patent and that said Letters Patent is hereby corrected as shown below:

<u>Title page, Item [54] and Column 1, line 1,</u>
Replace the Title as follows:
-- CORRELATION VALUE CALCULATOR FOR USE IN A MOBILE COMMUNICATION SYSTEM --

Signed and Sealed this

Second Day of September, 2003

JAMES E. ROGAN
*Director of the United States Patent and Trademark Office*